United States Patent
Willey et al.

(10) Patent No.: US 8,520,518 B2
(45) Date of Patent: Aug. 27, 2013

(54) METHODS AND APPARATUS FOR CONTROLLING WIRELESS NETWORK OPERATIONS ASSOCIATED WITH A FLOW CONTROL PROCESS

(75) Inventors: William Daniel Willey, Gilroy, CA (US); Shahid Rasul Chaudry, Kanata, CA (US); Hao Xue, Kanata, CA (US); Muhammad Khaledul Islam, Kanata, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 281 days.

(21) Appl. No.: 12/943,338

(22) Filed: Nov. 10, 2010

(65) Prior Publication Data

US 2011/0058476 A1    Mar. 10, 2011

Related U.S. Application Data

(63) Continuation of application No. 12/323,796, filed on Nov. 26, 2008, now Pat. No. 7,881,195, which is a continuation of application No. 10/788,494, filed on Feb. 27, 2004, now Pat. No. 7,483,373.

(60) Provisional application No. 60/543,113, filed on Feb. 9, 2004.

(51) Int. Cl.
    *H04L 1/00* (2006.01)

(52) U.S. Cl.
    USPC .......................................... 370/231; 370/235

(58) Field of Classification Search
    None
    See application file for complete search history.

(56) References Cited

U.S. PATENT DOCUMENTS

| 8,045,515 | B2 * | 10/2011 | Nookala et al. ............... 370/329 |
| 2004/0266450 | A1 * | 12/2004 | Chowdhury ............... 455/452.2 |

* cited by examiner

*Primary Examiner* — Kevin C Harper
*Assistant Examiner* — Rhonda Murphy
(74) *Attorney, Agent, or Firm* — John J. Oskorep, Esq.

(57) ABSTRACT

Techniques for controlling wireless network operations associated with a flow control process of a wireless network involving a data session established between a mobile station and a service node. The network processor examines quality of service (QoS) data associated with the data session. The network processor causes the flow control process to be bypassed for the mobile station based on the QoS data indicating that the data session is associated with a predetermined traffic class (e.g. background traffic class). This serves to prohibit the flow control process from stopping the flow of data packets in the data session without terminating the data session based on detection of an out-of-coverage condition. Otherwise, the network processor allows the flow control process to be performed for the mobile station based on the QoS data indicating that the data session is not associated with the predetermined traffic class.

20 Claims, 5 Drawing Sheets

METHODS AND APPARATUS FOR CONTROLLING WIRELESS NETWORK OPERATIONS ASSOCIATED WITH A FLOW CONTROL PROCESS

CROSS-REFERENCE TO RELATED APPLICATIONS

This application is a continuation of and claims priority to U.S. non-provisional patent application having application Ser. No. 12/323,796 and filing date of 26 Nov. 2008, now U.S. Pat. No. 7,881,195, which claims priority to U.S. non-provisional patent application having application Ser. No. 10/788,494 and filing date of 27 Feb. 2004, now U.S. Pat. No. 7,483,373 B2, which further claims the benefit of U.S. Provisional Patent Application of the same title having U.S. Ser. No. 60/543,113 and a filing date of 9 Feb. 2004, each application being hereby incorporated by referenced herein.

BACKGROUND

1. Field of the Technology

The present application relates generally to wireless network operations, and more particularly to methods and apparatus for controlling wireless network operations associated with "flow control" processes for "always-on" mobile stations.

2. Description of the Related Art

A wireless communication device, such as a cellular telephone or mobile station, is capable of making and receiving voice calls and/or sending and receiving data through a wireless communication network. Some of these mobile stations are deemed "always-on" devices as they primarily utilize data applications, such as e-mail communication or other "push"-type applications, which rely on a continuously-maintained Point-to-Point Protocol (PPP) session connection in the network.

The wireless communication network may be operative in accordance with the Third Generation Partnership Project 2 (3GPP2). In 3GPP2 systems, prior to TIA-835-C/IOSv4.3, there were problems in the Packet Data Service Node (PDSN) and Radio Access Network (RAN) that affected the ability to push data to an always-on mobile station. In some cases, if the mobile station is temporarily out-of-coverage when the RAN pages the mobile station to deliver data from the PDSN, the PPP connection between the PDSN and the mobile station would be torn down without the knowledge of the mobile station. This, in turn, stops data from being delivered to the mobile station until the PPP connection is re-established. In this situation, in order for the always-on mobile station to guarantee service, the mobile station would be required to perform extra messaging whenever it goes through a temporary out-of-coverage condition which wastes both mobile battery life and air interface capacity.

In TIA-835-C/IOSv43 these issues have been resolved. Changes have been made to the standards to eliminate these service outages to an always-on mobile station. In 3GPP2 a "flow control" process is being advocated which would give the Packet Control Function (PCF) the ability to request that the PDSN stop the flow of data to a mobile station based upon the condition of the wireless link. The rationale for the feature is that it saves air interface capacity by allowing the PDSN to resynchronize the compression state with the mobile station without messaging over the air interface.

Some always-on mobile stations, such as those providing for e-mail communications and other push-type applications, perform compression at the application layer without using PPP payload compression. For such mobile stations, there is little if any benefit gained by a flow control process. Furthermore, the use of flow control process with these mobile stations would result in the same problems that existed prior to TIA-835-C/IOSv4.3. Shutting off the flow of data from the PDSN to the PCF would result in either a service outage to the mobile station or the need for increased air interface messaging to counteract the effects of flow control.

Accordingly, there is a resulting need for methods and apparatus for controlling wireless network operations associated with a flow control process so as to overcome the deficiencies of the prior art.

BRIEF DESCRIPTION OF THE DRAWINGS

Embodiments of present application will now be described by way of example with reference to attached figures, wherein.

DETAILED DESCRIPTION OF THE PREFERRED EMBODIMENTS

Methods and apparatus for controlling wireless network operations associated with a flow control process which terminates data communications to a mobile station based on an out-of-coverage condition between the mobile station and a wireless communication network are described herein. In the wireless communication network, an indication is identified which indicates whether a mobile station utilizes an always-on connection for a data service. Based on the indication indicating that the mobile station utilizes the always-on connection, the flow control process is bypassed. Otherwise, the flow control, process is performed. The always-on connection may be utilized for an e-mail communication application for the mobile station and involve a Point-to-Point Protocol (PPP) session.

As described earlier in the Background section, in 3GPP2 a "flow control" process is being advocated which would give the Packet Control Function (PCF) the ability to request that the Packet Data Support Node (PDSN) stop the flow of data to a mobile station based upon the condition of the wireless link. The rationale for the feature is that it saves air interface capacity by allowing the PDSN to resynchronize the compression state with the mobile station without messaging over the air interface. Some always-on mobile stations (such as those providing for e-mail communications and other push-type applications), however, perform compression at the application layer without using PPP payload compression. For such mobile stations, there is little if any benefit gained by a flow control process. Furthermore, the use of flow control process with these mobile stations would result in the same problems that existed prior to that in TIA-835-C/IOSv4.3. Shutting off the flow of data from the PDSN to the PCF would result in either a service outage to the mobile station or the need for increased air interface messaging to counteract the effects of flow control.

Techniques to mitigate potential negative effects of flow control for "always-on" mobile stations are described herein which include: (1) Application of flow control only to mobile stations other than always-on mobile stations (i.e. PDSN does not stop the flow of data if the mobile station is an always-on mobile station); (2) Application of flow control based upon whether or not PPP payload compression is being used by the PDSN/MS (i.e. PDSN does not stop the flow of data if PPP payload compression is not being used); (3) Give the mobile station the ability to control whether or not flow control, is being used by the PDSN (e.g. use a bit in a 3GPP2 Vendor specific packet sent from the mobile station to the PDSN for a given service instance in the case of multiple concurrent services); PDSN does not stop flow of data unless the mobile station allows it to by the setting of the bit); (4) Have the PDSN shut off the flow of data based upon the amount and/or frequency of data being sent (e.g. apply flow control at the PDSN if the application is attempting push a large amount of data, but not for a small and infrequently sent email packet). Details for the above are further described below in relation to FIGS. 1-5.

Figure 1:
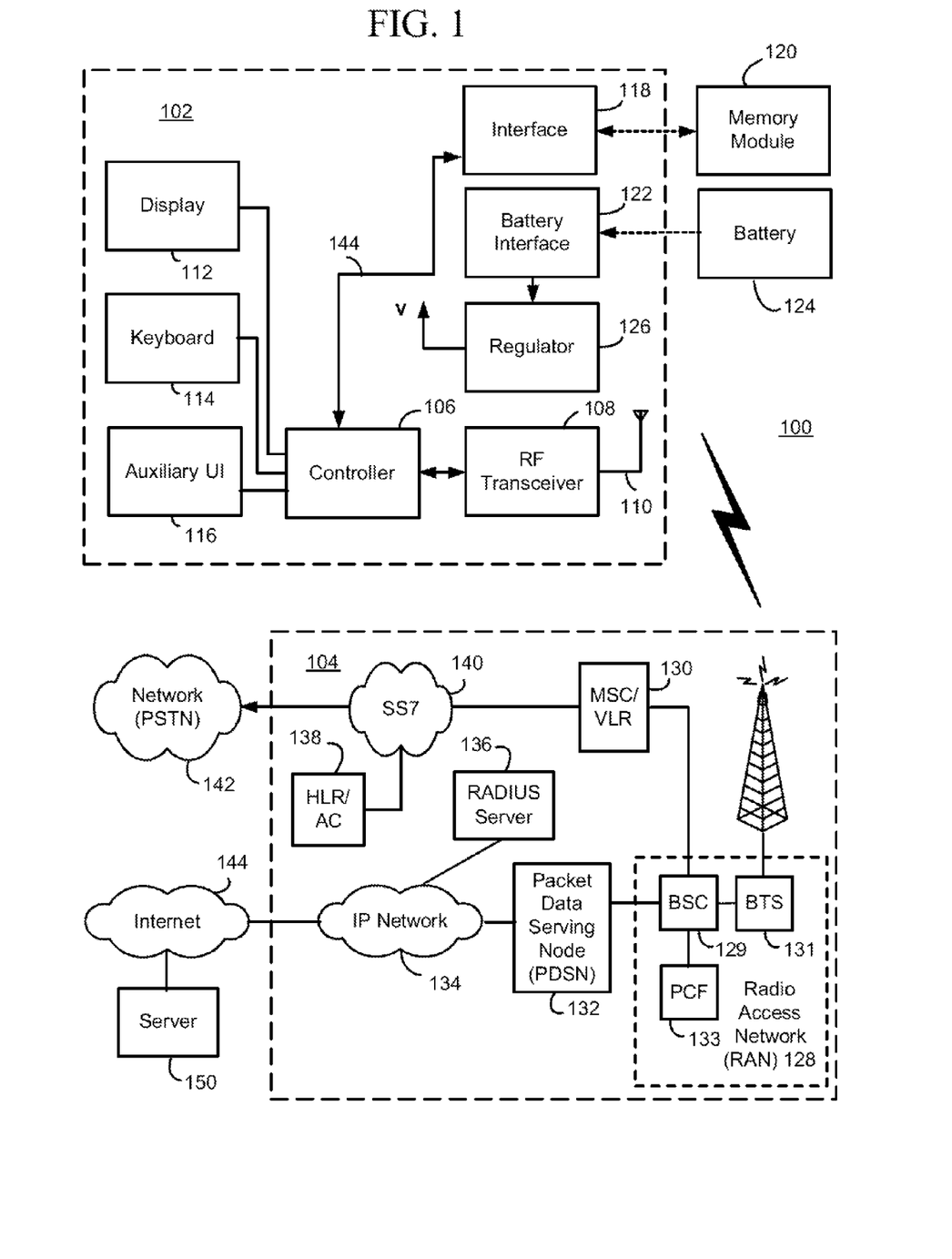
FIG. 1 is a block diagram which illustrates pertinent components of a wireless communication network and a mobile station which communicates within this network.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically keyed or turned on only when it is sending to network, and is otherwise turned off to conserve resources. Similarly, an RE receiver of RE transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into memory module 120 which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RE transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Second Generation (2G) or Third Generation (3G) supported network based on Code Division Multiple Access (CDMA) technologies. In particular, wireless network 104 is a CDMA2000® network which includes fixed network components coupled as shown in FIG. 1. Wireless network 104 of the CDMA2000-type includes a Radio Access Network (RAN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN) which may connect mobile station 102 with other call parties. On the other hand, IP network 134 is communicatively coupled to another network 144 such as the Internet. Note that CDMA2000® is a registered trademark of the Telecommunications Industry Association (TIA-USA).

During operation, mobile station 102 communicates with RAN 128 which performs functions such as call-setup, call processing, and mobility management. RAN 128 includes a base station controller (BSC) 129 and a plurality of base station transceiver systems (BTS), such as BTS 131. All of the BTSs 131 that provide wireless network coverage for a particular coverage area commonly referred to as a "cell". A given BTS 131 of RN 128 transmits communication signals to and receives communication signals from mobile stations within its cell. BTS 131 normally performs such functions as modulation and possibly encoding and/or encryption of signals to be transmitted to the mobile station in accordance with particular, usually predetermined, communication protocols and parameters, under control of its controller. BTS 131 similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

BSC 129 controls all of the BTSs 131, manages radio network resources, and provides user mobility. BSC 129 also performs voiced compression or vocoding, processes handovers, manages power control to ensure efficient use of network capacity, controls timing and synchronization within RAN 128, and provides interfaces to the BTSs 131 and PDSN 132. BSC 129 includes and communicates with a Packet Control Function (PCF) 133 which may be embodied as one or more servers. PCF 133 provides an interface to PDSN 132 via a RAN-to-PDSN interface, also known as the R-P or A10/A11 interface. The A10 interface carries user data whereas the A11 interface carries signalling data. PCF 133 is operate to manage packet-data states (e.g. active and dormant states) of the mobile station, relay packets between the mobile station and PDSN 132, buffer data received from PDSN 132 for dormant mobile stations, and facilitates handovers.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138.

In order to provide packet data services to mobile station 102 in a CDMA2000-based network, RAN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Note that mobile station 102 has a primary application which is an e-mail communication application and utilizes an "always-on" connection to wireless network 104 to facilitate this service. Thus, the packet-data connection between mobile station 102 and wireless network 104 is continuously maintained for the e-mail application. For this reason, mobile station 102 may be referred to as an "always-on" device. The service may be facilitated by a server connection to the network, such as a server 150. Note that other applications on mobile station 102 may not require an always-on connection. To set up a PPP session, mobile station 102 initiates a packet data call. Once the radio link is established between mobile station 102 and RAN 128, the R-P interface is set-up between RAN 128/PCF 133 and PDSN 132. PPP negotiation then starts between mobile station 102 and PDSN 132. Once mobile station 102 has made the PPP connection to PDSN 132, it remains connected to wireless network 104. All subsequent data transmissions between mobile station 102 and PDSN 132 can be initiated by mobile station 102 or by PDSN 132 over the PPP connection. Note that, when mobile station 102 is neither sending nor receiving data and has been inactive for a certain period, PCF 133 tears down the radio link between mobile station 102 and RAN 128 but maintains the PPP connection between mobile station 102 and PDSN 132. This is called a dormant state.

In 3GPP2 a "flow control" process is being advocated which would give PCF 133 the ability to request that PDSN 132 stop the flow of data to mobile station 102 based upon the condition of the wireless link (e.g. based on a particular out-of-coverage condition). The rationale for the feature is that it saves air interface capacity by allowing the PDSN 132 to resynchronize the compression state with mobile station 102 without messaging over the air interface. Some always-on mobile stations, however, such as those providing e-mail communications (e.g. mobile station 102), perform compression at the application layer without using PPP payload compression. For such mobile stations, there is little if any benefit gained by a flow control process. Furthermore, the use of flow control process with mobile station 102 would result in the same problems that existed prior to TIA-835-C/IOSv4.3. Shutting off the flow of data from PDSN 132 to PCF 133 would result in either a service outage to mobile station 102 or the need for increased air interface messaging to counteract the effects of flow control. Note that radio link protocol (RLP) also handles the impairment of the radio channel. On the other hand, the flow control process may be beneficial when used in connection with other types of mobile stations.

It can be appreciated that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
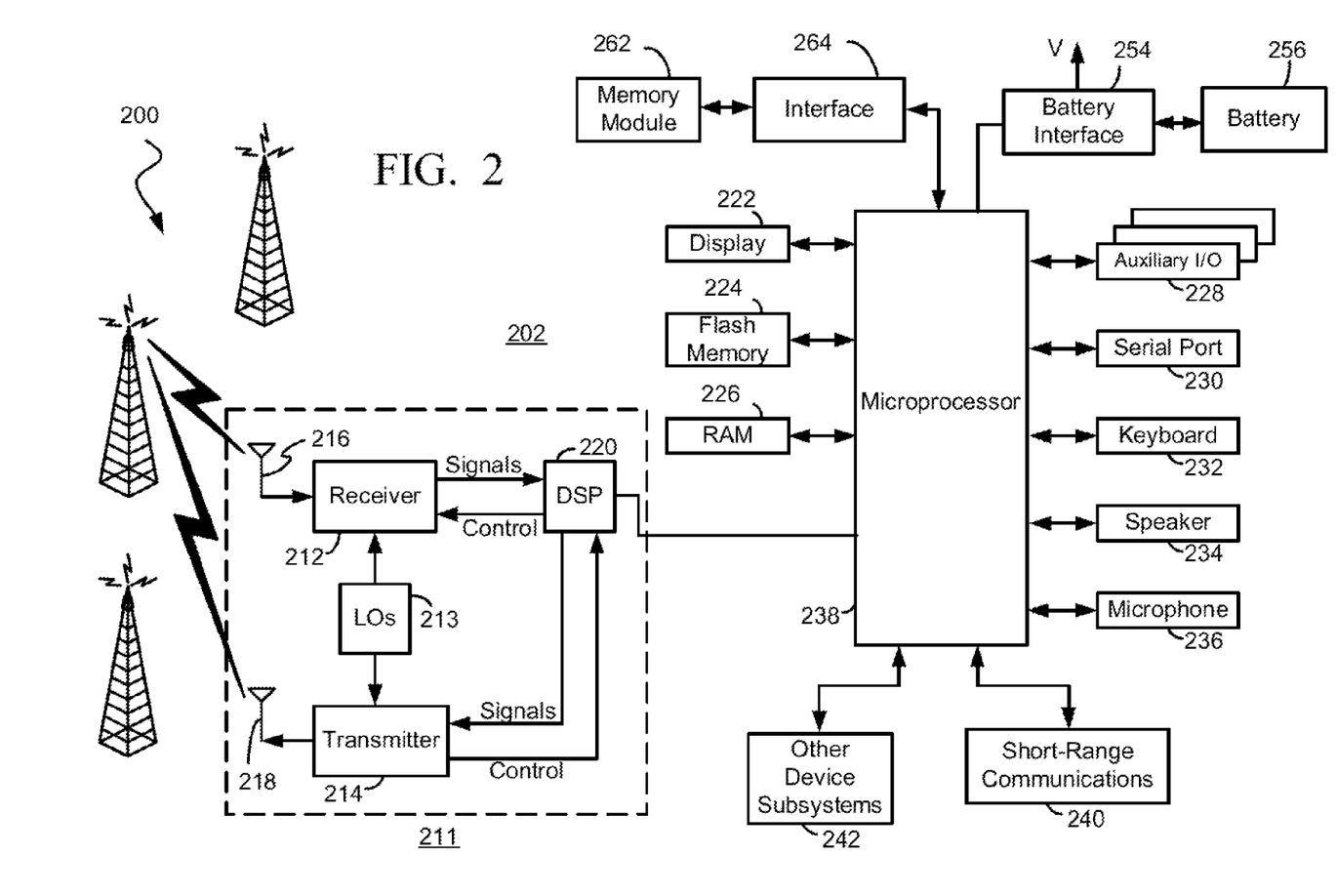
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with, as will be described in more detail later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOS) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power (represented with a voltage V) to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications (such as a network re-establishment scheme), will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG.

Figure 3:
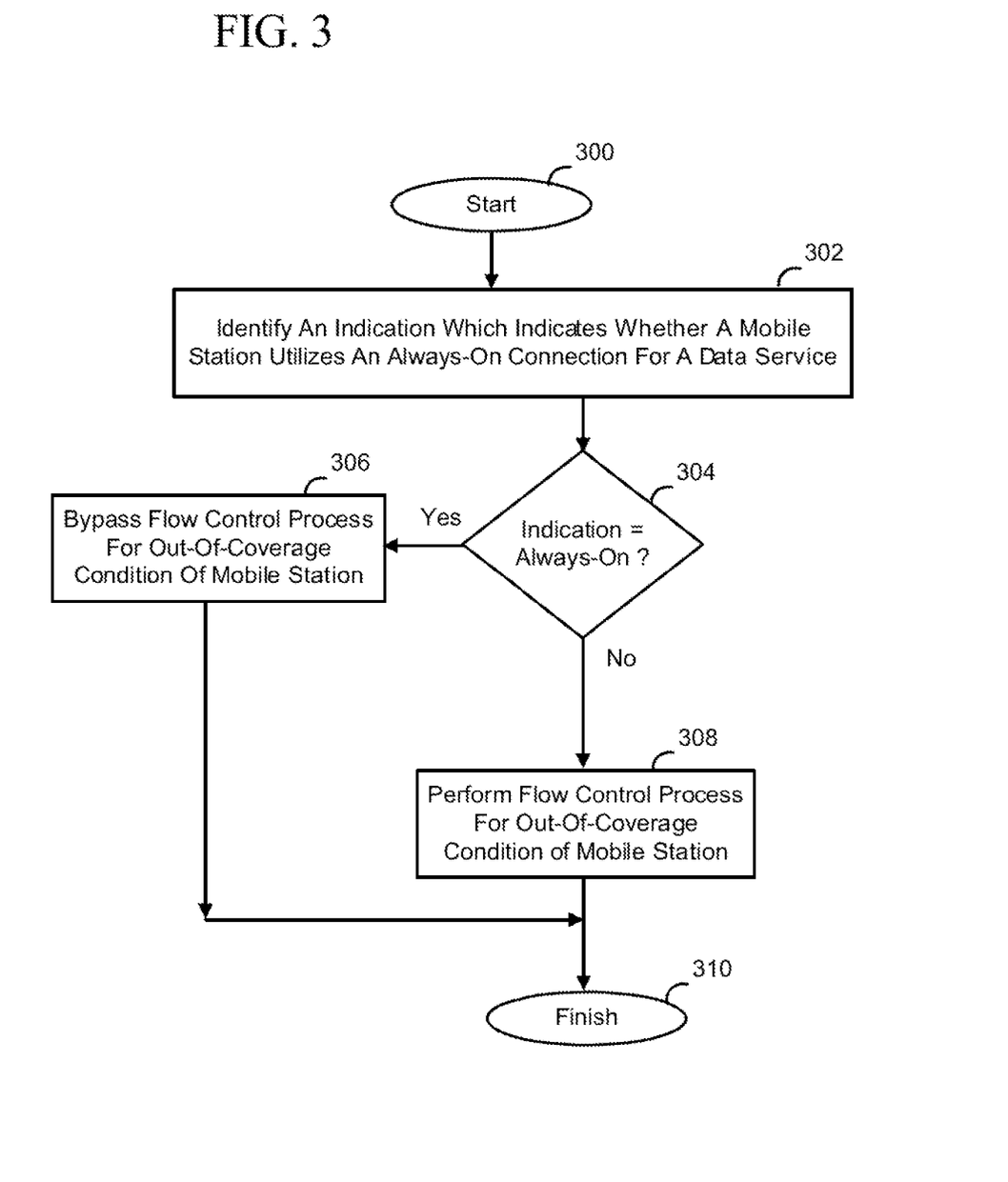
FIG. 3 is a flowchart for describing a method of controlling wireless network operations associated with a flow control process which terminates data communication to a mobile station based on an out-of-coverage condition between the mobile station and a wireless communication network.

FIG. 3 is a flowchart for describing a method of controlling wireless network operations associated with a flow control process which terminates data communication to a mobile station based on an out-of-coverage condition between the mobile station and a wireless communication network. The methods may be performed by a Radio Access Network (RAN) in connection with pertinent system components as described (e.g. in a Packet Control Function or PCF), using one or more servers and computer instructions. The method may be embodied in a computer program product which includes a computer storage medium (e.g. memory or computer disk) having computer instructions stored therein which are executable by one or more servers or processors.

The method begins at a start block 300 of FIG. 3. In the RAN, an indication is identified which indicates whether a mobile station utilizes an always-on connection for a data service (step 302 of FIG. 3). If the indication indicates that the mobile station utilizes the always-on connection (step 304 of FIG. 3), then a flow control process is bypassed for the mobile station (step 306 of FIG. 3). Otherwise from step 304, the flow control process is to be performed for the mobile station (step 308 of FIG. 3). The flowchart ends at a finish block 310. If an always-on connection is used by the mobile station, it may be for an e-mail application and involve a Point-to-Point Protocol (PPP) session.

The indication at step 302 may be that the mobile station is an always-on device. Alternatively, the indication at step 302 may be that the application, the data session, and/or the data connection for the mobile station is identified as being an always-on application, data session, and/or data connection. In case of multiple concurrent services, flow control may be selectively applied on a given service instance as mutually agreed between the mobile station and the PDSN. Here, the indication is received when the session is initially established and utilized thereafter as necessary. If the indication is in the form of data, the data could be as simple as a bit flag ('1'=always-on) or a larger amount of data.

Note that the indication that is indicative of whether the mobile station utilizes the always-on connection may be named in a variety of different ways. For example, the indication may be named as an "always-on device indicator" or an "always-on connection indicator". As another example, the indication may be named as a "control flow enable/disable". With the latter example, there is nonetheless still, a relationship between the "control flow enable/disable" indication and the mobile station/data connection (i.e. despite the name, the indication is still indicative of whether the mobile station utilizes the always-on data connection).

The indication may be received in the form of data that is sent from the mobile station to the wireless communication network. The mobile station may store this attribute in its memory (mobile station=always-on device) or, alternatively, store attributes in association with every suitable always-on application (Application A=always-on application; Application B=not always-on application) of the mobile station. The attribute information may be programmable and/or reprogrammable in memory of the mobile station, by a service person or the end user, as examples. This indication may be sent in a message from the mobile station once and stored in the network appropriately. Alternatively, the indication may be sent in a message from the mobile station upon each use of the device or each use of the application. The network stores this information accordingly (e.g. in the RAN or, more specifically the PCF) and uses it for the purposes herein as needed. Note that the indication may be sent from the mobile station in response to an input signal at a user interface of the mobile station. Thus, the end user may control whether or not a control flow process should be utilized. The attribute may be in the form of a 3GPP2 vendor-specific packet sent from the mobile station to the network.

Alternatively, the indication may be based upon the detection of any predetermined processes utilized for an always-on connection. For example, the predetermined process could be a compression processes which may or may not be utilized. For example, the preferred always-on mobile station of the present application does not utilize compression at the PPP level for e-mail communication whereas other mobile stations do utilize the PPP compression. Thus, flow control may be bypassed if the RAN or PCF detects that the connection does not utilize PPP compression. Conversely, flow control may be performed if the RAN or PCF detects that the connection does utilize PPP compression.

As another alternative, the indication may be based upon the amount and/or the frequency of data being communicated using the data service. For example, the RAN or PCF may identify a relatively slow data rate or a relatively high data rate of communication over the connection. Thus, flow control may be bypassed if the RAN or PCF detects that the connection pushes relatively small amounts of packet data at infrequency intervals for e-mail communication. Conversely, flow control may be performed if the RAN or PCF detects that the connection pushes relatively large amounts of packet data at frequency intervals. As a specific alternative, the indication may be based on examining Quality of Service (QoS) data of the data service. A number of different types of QoS traffic classes are defined for data communication including (1) streaming (e.g. video); (2) interactive (e.g. web browsing); (3) background; and (4) conversational (e.g. voice). E-mail data communication falls under the "background" traffic class and may be identified as such in the network. Thus, the RAN or PCF may read QoS data to identify whether the data service is of the background traffic class type and, if so, infer that the PPP connection is an always-on connection.

Figure 4:
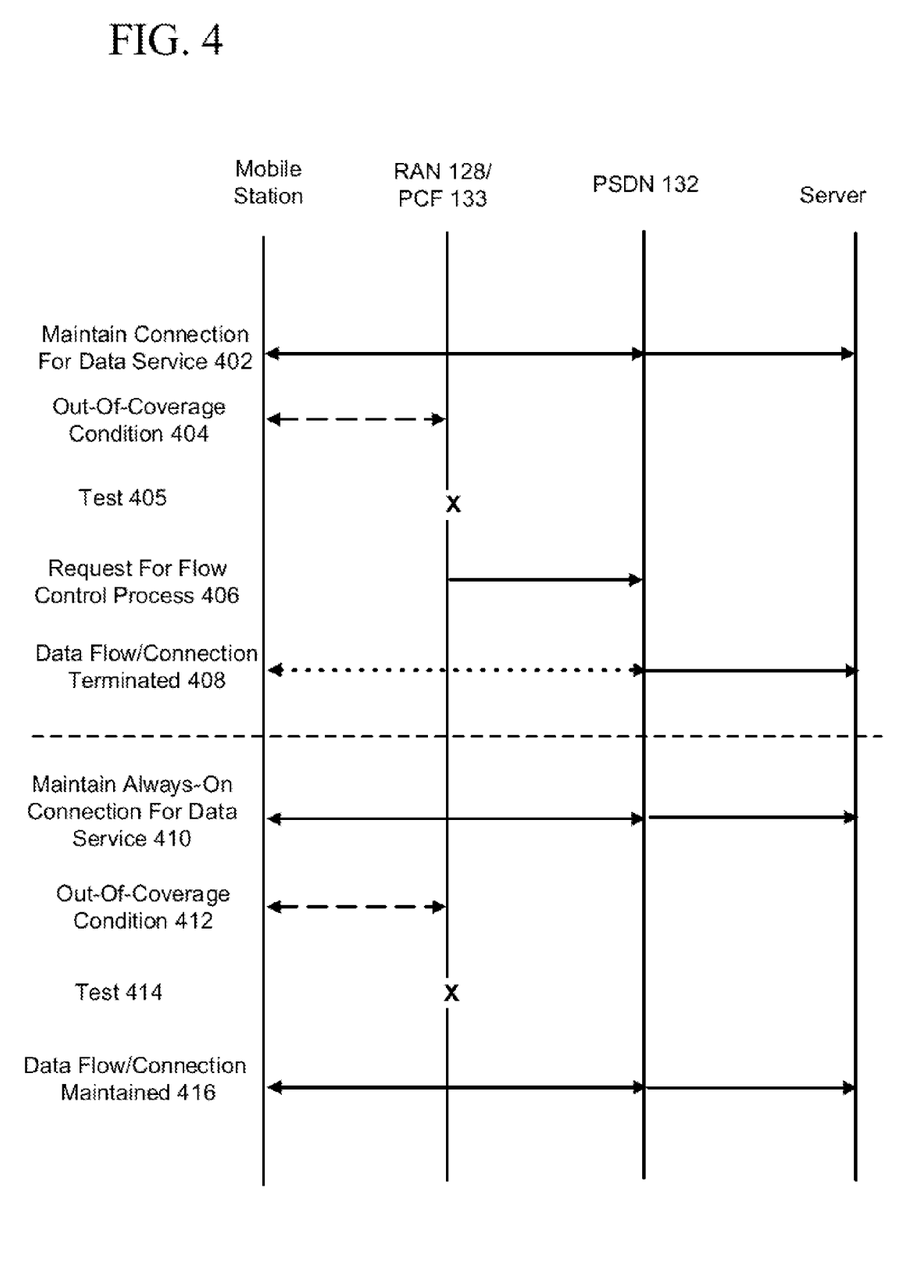
FIG. 4 is a system flow diagram for a mobile station which does not have an always-on connection, and for a mobile station that does have an always-on connection.

FIG. 4 is a system flow diagram for mobile station operation in connection with the wireless network. In the example of FIG. 4, PCF 133 is the entity that performs control over the flow control process in accordance with the present techniques. A data connection for an application is established between a mobile station and a server (process 402 of FIG. 4). In this example, the mobile station is not an always-on device and the data connection does not include an always-on connection. An out-of-coverage condition occurs between the mobile station and the BTS of RAN 128 which is detected by the network (process 404 of FIG. 4). RAN 128 or PCF 133 therefore checks whether the flow control process should be performed (process 405 of FIG. 4). In this case, RAN 128 or PCF 133 identifies that the mobile station and/or its data connection is not always-on. Since the mobile station and/or its data connection is not always-on, RAN 128 or PCF 133 causes the flow control, process to be performed and sends a request to PDSN 132 regarding the same (process 406 of FIG. 4). This request could be in an A11 message. The data flow is terminated (process 408 of FIG. 4), and the PPP session may or may not be terminated.

The second discussion for FIG. 4 involves a mobile station that is an always-on device and/or has an always-on connection. A data connection for an application is maintained between the mobile station and the server (process 410 of FIG. 4). The data connection includes an always-on connection which involves a PPP connection between mobile station 102 and PDSN 132. Next, an out-of-coverage condition occurs between the mobile station and the BTS of RAN 128 which is detected by the network (process 412 of FIG. 4). RAN 128 or PCF 133 therefore checks whether flow control process should be performed (process 414 of FIG. 4). In this case, RAN 128 or PCF 133 identifies that the mobile station and/or its data connection is always-on. PDSN 132 signals PCF 133 whether or not flow control should be utilized, preferably on a session-by-session basis when the session is initially established. The messaging may utilize an A11 message. Since the mobile station and/or its data connection is always-on, RAN 128 or PCF 133 causes the flow control process to be bypassed, where the data flow is not terminated and the PPP session is maintained (process 416 of FIG. 4). No request from RAN 128 or PCF 133 to PDSN 132 needs to be made.

Figure 5:
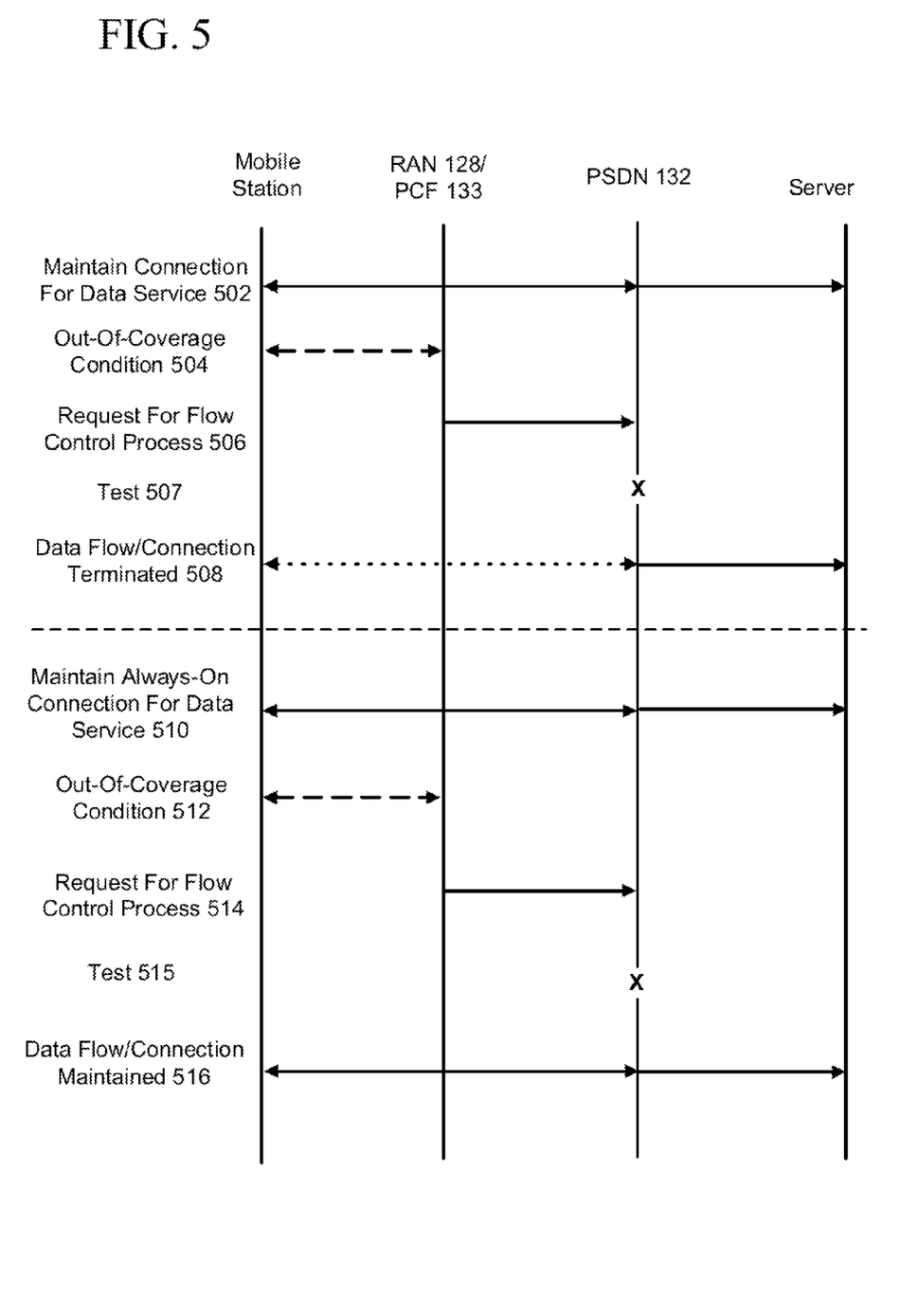
FIG. 5 is another system flow diagram for a mobile station which does not have an always-on connection, and for a mobile station that does have an always-on connection.

FIG. 5 is another system flow diagram for mobile station operation in connection with the wireless network. In the example of FIG. 5, PDSN 132 is the entity that performs control over the flow control process in accordance with the present techniques. A data connection for an application is established between a mobile station and a server (process 502 of FIG. 5). In this example, the mobile station is not an always-on device and the data connection does not include an always-on connection. An out-of-coverage condition occurs between the mobile station and the BTS of RAN 128 which is detected by the network (process 504 of FIG. 5). RAN 128, or specifically PCF 133, therefore initiates the flow control process and sends a request to PDSN 132 for the flow control process (process 506 of FIG. 5). In this case, PDSN 132 identifies that the mobile station and/or its data connection is not always-on (process 507 of FIG. 5). Since the mobile station and/or its data connection is not "always-on", PDSN 132 allows the flow control process to be performed where the data flow is terminated (process 508 of FIG. 5), and the PPP session may or may not be terminated.

The second discussion associated with FIG. 5 involves a mobile station that is an always-on device and/or has an always-on connection. A data connection for an application is maintained between the mobile station and the server (process 510 of FIG. 5). The data connection includes an always-on connection which involves a PPP connection between mobile station 102 and PDSN 132. Next, an out-of-coverage condition occurs between the mobile station and the BTS of RAN 128 which is detected by the network (process 512 of FIG. 5). RAN 128, or specifically PCF 133, therefore initiates the flow control process and sends a request to PDSN 132 for the flow control process (process 514 of FIG. 5). In this case, PDSN 132 identifies that the mobile station and/or its data connection is always-on (process 515 of FIG. 5). Since the mobile station and/or its data connection is always-on, PDSN 132 causes the flow control process to be bypassed, where the data flow is not terminated and the PPP session is maintained (process 516 of FIG. 5).

Note again that the indication which is indicative of whether the mobile station utilizes the always-on connection may be named in a variety of different ways. For example, the indication may be named as an "always-on device" indicator or an "always-on connection" indicator. As another example, the indication may be named as a "control flow enable/disable" indicator. With the latter example, there is nonetheless still a relationship between the indication and the mobile station/data connection (i.e. despite the name, the indication is still indicative of whether the mobile station utilizes the always-on data connection).

Note also that multiple data connections may be established for a single mobile station. For example, a mobile station may have a first connection for a first application which includes an always-on connection, and a second connection for a second application which does not include an always-on connection. In the network, the flow control process may be bypassed for the first connection but utilized for the second connection. Thus, there is a selective mutually-agreed upon flow control of certain services when there are multiple concurrent services in effect for any given mobile station.

Final Comments. Methods and apparatus for controlling wireless network operations associated with a flow control process which terminates data communications to a mobile station based on an out-of-coverage condition between the mobile station and a wireless communication network. In the wireless communication network, an indication is identified which indicates whether a mobile station utilizes an always-on connection for a data service. Based on the indication indicating that the mobile station utilizes the always-on connection, the flow control process is bypassed. Otherwise, the flow control process is performed. The always-on connection may be utilized for an e-mail communication application for the mobile station and involve a Point-to-Point Protocol (PPP) session.

In one embodiment, a Radio Access Network (RAN) of a wireless communication network which is configured to control wireless network operations associated with a flow control process which terminates data communications to a mobile station based on an out-of-coverage condition between the mobile station and a wireless communication network is utilized. The RAN includes a Packet Control Function (PCF) which communicates with a Packet Service Data Node (PDSN). The PCF is operative to identify an indication which indicates whether a mobile station utilizes an always-on connection for a data service provided through the wireless communication network; cause the flow control process to be bypassed for the mobile station based on the indication indicating that the mobile station utilizes the always-on connection; and otherwise cause the flow control process to be performed for the mobile station in connection with the PDSN.

In another embodiment, a Packet Service Data Node (PDSN) which communicates with a Packet Control Function (PCF) of a Radio Access Network (RAN) is utilized. The PDSN is configured to control wireless network operations associated with a flow control process which terminates data communications to a mobile station based on an out-of-coverage condition between the mobile station and a wireless communication network. The PDSN is operative to identify an indication which indicates whether a mobile station utilizes an always-on connection for a data service provided through the wireless communication network; cause the flow control process to be bypassed for the mobile station based on the indication indicating that the mobile station utilizes the always-on connection; and otherwise, cause the flow control process to be performed for the mobile station.

The above-described embodiments of the present application are intended to be examples only. Those of skill in the art may effect alterations, modifications and variations to the particular embodiments without departing from the scope of the application. The invention described herein in the recited claims intends to cover and embrace all such changes in technology.

What is claimed is:

1. A method of controlling wireless network operations associated with a flow control process of a wireless communication network involving a data session established between a mobile station and a service node, the flow control process being operative to stop a flow of data packets being communicated to the mobile station in the data session without terminating the data session based on detection of an out-of-coverage condition between the mobile station and the wireless network, the method comprising the acts of:
    examining, by a network processor, quality of service (QoS) data associated with the data session;
    causing, by the network processor, the flow control process to be bypassed for the mobile station based on the QoS data indicating that the data session is associated with a predetermined traffic class, so as to prohibit the flow control process from stopping the flow of data packets in the data session without terminating the data session based on detection of the out-of-coverage condition; and
    allowing the flow control process to be performed for the mobile station based on the QoS data indicating that the data session is not associated with the predetermined traffic class.

2. The method of claim 1, wherein the flow control process of the wireless network is operative in accordance with TIA-835-C/IOS.

3. The method of claim 1, wherein the predetermined traffic class is associated with an e-mail communication service.

4. The method of claim 1, wherein the predetermined traffic class comprises a background traffic class.

5. The method of claim 1, wherein the predetermined traffic class comprises a background traffic class, and wherein other traffic classes include a streaming traffic class and an interactive traffic class.

6. The method of claim 1 wherein the data session comprises a Point-to-Point Protocol (PPP) session.

7. The method of claim 1, which is embodied as computer instructions stored in a non-transitory computer readable medium, the computer instructions being executable by the network processor to perform the steps of the method.

8. A packet control function of a wireless network, the packet control function being configured to control wireless network operations associated with a flow control process of the wireless network involving a data session established between a mobile station and a service node, the flow control process being operative to stop a flow of data packets being communicated to a mobile station in the data session without terminating the data session based on detection of an out-of-coverage condition between the mobile station and the wireless network, the packet control function being further operative to:
    communicate with the service node;
    examine quality of service (QoS) data associated with the data session;
    cause the flow control process to be bypassed for the mobile station based on the QoS data indicating that the data session is associated with a predetermined traffic class, so as to prohibit the flow control process from stopping the flow of data packets in the data session without terminating the data session based on detection of the out-of-coverage condition; and
    allow the flow control process to be performed for the mobile station in connection with the service node based on the indication indicating that the QoS data indicating that the data session is not associated with the predetermined traffic class.

9. The packet control function of claim 8, wherein the flow control process of the wireless network is operative in accordance with TIA-835-C/IOS.

10. The packet control function of claim 8, wherein the predetermined traffic class is associated with an e-mail communication service.

11. The packet control function of claim 8, wherein the predetermined traffic class comprises a background traffic class.

12. The packet control function of claim 8, wherein the predetermined traffic class comprises a background traffic class, and wherein other traffic classes include a streaming traffic class and an interactive traffic class.

13. The packet control function of claim 8, wherein the data session comprises a Point-to-Point Protocol (PPP) session.

14. The packet control function of claim 8, comprising a Packet Control Function (PCF) operative to communicate with a service node comprising a Packet Data Service Node (PSN).

15. A service node which is configured to control wireless network operations associated with a flow control process of the wireless network involving a data session established between a mobile station and the service node, the flow control process being operative to stop a flow of data packets being communicated to the mobile station in the data session without terminating the data session based on detection of an out-of-coverage condition between the mobile station and the wireless network, the service node being further operative to:
    examine quality of service (QoS) data associated with the data session;
    cause the flow control process to be bypassed for the mobile station based on the QoS data indicating that the data session is associated with a predetermined traffic class, so as to prohibit the flow control process from stopping the flow of data packets in the data session without terminating the data session based on detection of the out-of-coverage condition; and
    allow the flow control process to be performed for the mobile station based on the QoS data indicating that the data session is not associated with the predetermined traffic class.

16. The service node of claim 15, comprising a Packet Data Service Node (PSN).

17. The service node of claim 15, wherein the flow control process of the wireless network is operative in accordance with TIA-835-C/IOS.

18. The service node of claim 15, wherein the predetermined traffic class is associated with an e-mail communication service.

19. The service node of claim 15, wherein the predetermined traffic class comprises a background traffic class.

20. The service node of claim 15, wherein the data session comprises a Point-to-Point Protocol (PPP) session.

* * * * *